United States Patent
Lozano et al.

(10) Patent No.: US 11,427,937 B2
(45) Date of Patent: Aug. 30, 2022

(54) HANDHELD/PORTABLE APPARATUS FOR THE PRODUCTION OF MICROFIBERS, SUBMICRON FIBERS AND NANOFIBERS

(71) Applicant: The Board of Regents of The University of Texas System, Austin, TX (US)

(72) Inventors: Karen Lozano, McAllen, TX (US); Gregory Potter, Edinburg, TX (US); Javier Alonzo Ortega, Pharr, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 0 days.

(21) Appl. No.: 16/652,928

(22) PCT Filed: Feb. 19, 2020

(86) PCT No.: PCT/US2020/018725
§ 371 (c)(1),
(2) Date: Apr. 1, 2020

(87) PCT Pub. No.: WO2020/172207
PCT Pub. Date: Aug. 27, 2020

(65) Prior Publication Data
US 2021/0198810 A1    Jul. 1, 2021

Related U.S. Application Data

(60) Provisional application No. 62/807,999, filed on Feb. 20, 2019.

(51) Int. Cl.
*D01D 4/02* (2006.01)
*D01D 5/18* (2006.01)
(Continued)

(52) U.S. Cl.
CPC ............... *D01D 5/18* (2013.01); *B29C 48/02* (2019.02); *B29C 48/301* (2019.02); *D01D 1/09* (2013.01); *D01H 17/00* (2013.01)

(58) Field of Classification Search
CPC ........ B29C 48/02; B29C 48/301; D01D 4/02; D01D 5/18
(Continued)

(56) References Cited

U.S. PATENT DOCUMENTS

| 2,336,743 A | 10/1941 | Manning |
| 2,609,566 A | 9/1952 | Slayter et al. |

(Continued)

FOREIGN PATENT DOCUMENTS

| CN | 1472373 | 2/2004 |
| CN | 101805942 | 8/2010 |

(Continued)

OTHER PUBLICATIONS

Aquilano et al. "{1 0 0} and {1 1 1} forms of the NaCl crystals coexisting in growth from pure aqueous solution" Journal of Crystal Growth (2009) 311(2):399-403.
(Continued)

*Primary Examiner* — Leo B Tentoni
(74) *Attorney, Agent, or Firm* — Kowert, Hood, Munyon, Rankin & Goetzel, P.C.; Gareth M. Sampson

(57) ABSTRACT

Described herein are portable apparatuses and methods of creating fibers, such as microfibers and nanofibers. The methods discussed herein employ centrifugal forces to transform material into fibers. Portable apparatuses that may be used to create fibers are described.

20 Claims, 6 Drawing Sheets

(51) Int. Cl.
  *D01D 1/09* (2006.01)
  *D01H 17/00* (2006.01)
  *B29C 48/02* (2019.01)
  *B29C 48/30* (2019.01)

(58) Field of Classification Search
  USPC .............................. 425/8, 381.2, 382.2, 464
  See application file for complete search history.

(56) References Cited

U.S. PATENT DOCUMENTS

| | | |
|---|---|---|
| 3,245,112 A | 4/1966 | Williamson |
| 3,388,194 A | 6/1968 | Vinicki |
| 3,428,724 A | 2/1969 | Billheimer |
| 3,529,934 A | 9/1970 | Shindo |
| 3,551,557 A | 12/1970 | Garcia |
| 3,920,362 A | 11/1975 | Bradt |
| 4,043,331 A | 8/1977 | Martin et al. |
| 4,070,446 A | 1/1978 | Horikiri et al. |
| 4,113,666 A | 9/1978 | Sano et al. |
| 4,323,524 A | 4/1982 | Snowden |
| 4,323,525 A | 4/1982 | Bornat |
| 4,374,074 A | 2/1983 | Ueda et al. |
| 4,526,525 A | 7/1985 | Oiso et al. |
| 4,790,736 A | 12/1988 | Keuchel |
| 4,793,782 A | 12/1988 | Sullivan |
| 4,872,821 A | 10/1989 | Weiss |
| 5,066,430 A | 11/1991 | Matthews |
| 5,165,940 A | 11/1992 | Windley |
| 5,242,633 A | 9/1993 | Rook et al. |
| 5,326,241 A | 7/1994 | Rook et al. |
| 5,344,297 A | 9/1994 | Hills |
| 5,419,794 A | 5/1995 | Hauber et al. |
| 5,441,754 A | 8/1995 | Evans, Sr. |
| 5,447,423 A | 9/1995 | Fuisz et al. |
| 5,458,823 A | 10/1995 | Perkins et al. |
| 5,460,498 A | 10/1995 | Steel et al. |
| 5,480,598 A | 1/1996 | Gentile et al. |
| 5,556,589 A | 9/1996 | Sibal |
| 5,582,841 A | 12/1996 | Watton et al. |
| 5,622,671 A | 4/1997 | Pellegrin et al. |
| 5,667,814 A | 9/1997 | Shah |
| 5,698,146 A | 12/1997 | Schippers et al. |
| 5,718,716 A | 2/1998 | Goddard et al. |
| 5,785,996 A | 7/1998 | Snyder |
| 5,911,942 A | 6/1999 | Fofonoff et al. |
| 5,939,120 A | 8/1999 | Bogue et al. |
| 5,948,334 A | 9/1999 | Takeuchi et al. |
| 5,972,497 A | 10/1999 | Hirwe et al. |
| 5,985,193 A | 11/1999 | Harrington et al. |
| 6,110,590 A | 8/2000 | Zarkoob et al. |
| 6,159,597 A | 12/2000 | Meerman et al. |
| 6,216,430 B1 | 4/2001 | Oppermann |
| 6,221,487 B1 | 4/2001 | Luo et al. |
| 6,235,392 B1 | 5/2001 | Luo et al. |
| 6,382,526 B1 | 5/2002 | Reneker et al. |
| 6,511,930 B1 | 1/2003 | Luo et al. |
| 6,524,514 B1 | 2/2003 | Volokitin et al. |
| 6,548,166 B2 | 4/2003 | Figuly et al. |
| 6,596,033 B1 | 7/2003 | Luo et al. |
| 6,682,677 B2 | 1/2004 | Lobovsky et al. |
| 6,713,011 B2 | 3/2004 | Chu et al. |
| 6,753,454 B1 | 6/2004 | Smith et al. |
| 6,783,708 B2 | 8/2004 | Konishi |
| 6,787,090 B2 | 9/2004 | Dalton et al. |
| 6,843,902 B1 | 1/2005 | Penner et al. |
| 6,852,410 B2 | 2/2005 | Veedu et al. |
| 6,858,168 B1 | 2/2005 | Vollrath et al. |
| 6,872,311 B2 | 3/2005 | Koslow |
| 6,904,745 B2 | 6/2005 | Badiali et al. |
| 7,018,188 B2 | 3/2006 | James et al. |
| 7,032,664 B2 | 4/2006 | Lord et al. |
| 7,036,592 B2 | 5/2006 | Nguyen et al. |
| 7,056,455 B2 | 6/2006 | Matyjaszewski et al. |
| 7,056,849 B2 | 6/2006 | Wan et al. |
| 7,067,444 B2 | 6/2006 | Luo et al. |
| 7,118,698 B2 | 10/2006 | Armantrout et al. |
| 7,127,294 B1 | 10/2006 | Wang et al. |
| 7,134,857 B2 | 11/2006 | Andrady et al. |
| 7,146,792 B2 | 12/2006 | Badiali et al. |
| 7,169,374 B2 | 1/2007 | Siochi et al. |
| 7,186,474 B2 | 3/2007 | Jang |
| 7,208,546 B2 | 4/2007 | Rajagopalan et al. |
| 7,288,306 B2 | 10/2007 | Kersey |
| 7,316,723 B2 | 1/2008 | Chung et al. |
| 7,332,050 B2 | 2/2008 | Kim |
| 7,655,175 B2 | 2/2010 | Michael et al. |
| 7,666,343 B2 | 2/2010 | Johnson et al. |
| 7,691,168 B2 | 4/2010 | Fox et al. |
| 7,763,228 B2 | 7/2010 | Oya et al. |
| 7,857,608 B2 | 12/2010 | Fabbricante et al. |
| 7,901,195 B2 | 3/2011 | Fabbricante et al. |
| 8,110,136 B2 | 2/2012 | Takahashi et al. |
| 8,163,227 B2 | 4/2012 | Sumida et al. |
| 8,231,378 B2 | 7/2012 | Lozano et al. |
| 8,277,711 B2 | 10/2012 | Huang et al. |
| 8,721,319 B2 | 5/2014 | Lozano et al. |
| 8,828,294 B2 | 9/2014 | Lozano et al. |
| 9,228,276 B2 | 1/2016 | Barton et al. |
| 9,988,271 B2 | 6/2018 | Lozano et al. |
| 10,087,554 B2 | 10/2018 | Lozano et al. |
| 10,422,054 B2 | 9/2019 | Lozano et al. |
| 2001/0033037 A1 | 10/2001 | Nitschke et al. |
| 2002/0035354 A1 | 3/2002 | Mirle et al. |
| 2002/0106509 A1 | 8/2002 | Figuly et al. |
| 2004/0076661 A1 | 4/2004 | Chu et al. |
| 2004/0096533 A1 | 5/2004 | Dubson et al. |
| 2004/0241216 A1 | 12/2004 | Klun et al. |
| 2005/0054830 A1 | 3/2005 | Islam et al. |
| 2005/0081506 A1 | 6/2005 | Badiali et al. |
| 2005/0136253 A1 | 6/2005 | Michael et al. |
| 2005/0163955 A1 | 7/2005 | Schaefer et al. |
| 2006/0024399 A1 | 2/2006 | Chang et al. |
| 2006/0048355 A1 | 3/2006 | Kim |
| 2006/0049542 A1 | 3/2006 | Chu et al. |
| 2006/0091582 A1 | 5/2006 | James et al. |
| 2006/0228435 A1 | 10/2006 | Andrady et al. |
| 2007/0023958 A1 | 2/2007 | LaVietes et al. |
| 2007/0057414 A1 | 3/2007 | Hartge |
| 2007/0184079 A1 | 8/2007 | Gabbay |
| 2008/0023888 A1 | 1/2008 | Brang et al. |
| 2008/0029617 A1 | 2/2008 | Marshall et al. |
| 2008/0050304 A1 | 2/2008 | Oya et al. |
| 2008/0136054 A1 | 6/2008 | Fabbricante et al. |
| 2008/0211121 A1 | 9/2008 | Lai et al. |
| 2008/0242171 A1 | 10/2008 | Huang et al. |
| 2009/0020921 A1 | 1/2009 | Cakmak et al. |
| 2009/0042475 A1 | 2/2009 | Pourdeyhimi |
| 2009/0102100 A1 | 4/2009 | Hellring et al. |
| 2009/0142581 A1 | 6/2009 | Heintz et al. |
| 2009/0155326 A1 | 6/2009 | Mack et al. |
| 2009/0160099 A1 | 6/2009 | Huang |
| 2009/0162468 A1 | 6/2009 | Barinov et al. |
| 2009/0232920 A1 | 9/2009 | Lozano et al. |
| 2009/0269429 A1 | 10/2009 | Lozano et al. |
| 2009/0280207 A1 | 11/2009 | Lozano et al. |
| 2009/0280325 A1 | 11/2009 | Lozano et al. |
| 2010/0168808 A1 | 7/2010 | Citron |
| 2010/0233115 A1 | 9/2010 | Patel et al. |
| 2011/0147301 A1 | 6/2011 | Johnson et al. |
| 2011/0156319 A1 | 6/2011 | Kurokawa et al. |
| 2012/0077406 A1 | 3/2012 | Scrivens et al. |
| 2012/0082711 A1 | 4/2012 | Goranov |
| 2012/0135448 A1 | 5/2012 | Parker et al. |
| 2012/0292795 A1 | 11/2012 | Peno |
| 2012/0292796 A1 | 11/2012 | Peno |
| 2012/0292810 A1 | 11/2012 | Peno |
| 2012/0294966 A1 | 11/2012 | Peno |
| 2012/0295021 A1 | 11/2012 | Peno |
| 2012/0304613 A1 | 12/2012 | Peno |
| 2013/0149367 A1 | 6/2013 | Messier et al. |
| 2013/0214442 A1 | 8/2013 | Naskar |
| 2013/0299748 A1 | 11/2013 | Kazaryan et al. |
| 2014/0025179 A1 | 2/2014 | Kay et al. |

(56) References Cited

U.S. PATENT DOCUMENTS

| | | |
|---|---|---|
| 2014/0159263 A1 | 6/2014 | Lozano et al. |
| 2015/0184317 A1 | 7/2015 | Lozano et al. |
| 2015/0354094 A1 | 12/2015 | Parker et al. |
| 2016/0015098 A1 | 1/2016 | Conlon |

FOREIGN PATENT DOCUMENTS

| | | |
|---|---|---|
| CN | 101922060 | 12/2010 |
| CN | 209584428 | 3/2019 |
| DE | 19621231 | 7/1997 |
| EP | 0 003 908 | 9/1979 |
| EP | 0 306 033 | 3/1989 |
| EP | 0 472 067 | 2/1992 |
| EP | 0 709 035 | 5/1996 |
| EP | 1 673 493 | 7/2009 |
| JP | 2001073222 | 3/2001 |
| JP | 2009270221 | 11/2009 |
| KR | 20040052685 | 6/2004 |
| WO | 03/042436 | 5/2003 |
| WO | 2004/056716 | 7/2004 |
| WO | 2005024101 | 3/2005 |
| WO | 2005/042813 | 5/2005 |
| WO | 2009/079523 | 6/2006 |
| WO | 2008/077349 | 7/2008 |
| WO | 2008/121338 | 10/2008 |
| WO | 2010/132636 | 11/2010 |
| WO | 2012/068402 | 5/2012 |

OTHER PUBLICATIONS

Assouline et al. "Nucleation ability of multiwalled carbon nanotubes in polypropylene composites" Journal of Polymer Science Part B: Polymer Physics (2003) 41(5), 520-527.

Badrossamay et al. "Nanofiber Assembly by Rotary Jet-Spinning" Nano Lett. 2010, 10, 2257-2261.

Baji et al "Electrospinning of polymer nanofibers: effects on oriented morphology, structures and tensile properties" Composites Science and Technology (2010) 70(5), 703-718.

Champion et al. "Making Micro- and Nanoparticles of Complex Shapes" PNAS, 2007, 104:11901-11904.

Cho et al. "Structural properties and superhydrophobicity of electrospun polypropylene fibers from solution and melt", Polymer (2010), 51(25), 6005-6012.

"Cotton Candy Express" Available at http://cottoncandyexpress.com/resimachine, Jun. 8, 2009.

Cui et al. "Facile synthesis of core/shell-structured Sn/onion-like carbon nanocapsules as high-performance anode material for lithium-ion batteries" Materials Letters (2015) 143: p. 35-37.

Dabirian et al. "A comparative study of jet formation and nanofiber alignment in electrospinning and electrocentrifugal spinning systems" Journal of Electrostatics (2011) 69(6): p. 540-546.

Dauner "Centrifuge Spinning—An Economic Alternative to Electrospinning" Nano-Cluster Bodensee, NanoEurope 2006, Sep. 14, 2006.

Foster et al. "Centrifugally Spun Polyhydroxybutyrate Fibres: Accelerated Hydrolytic Degredation Studies" Polymer Degradation and Stability, 2005, 87(1), 1-10. (Abstract).

Greensfelder "Nanofibers Created in Orderly Fashion" UC Berkeley Press Release, Jun. 1, 2009.

Ji et al. "Recent developments in nanostructured anode materials for rechargeable lithium-ion batteries" Energy & Environmental Science (2011) 4(8): p. 2682-2699.

Jiang et al. "Centrifugally-spun tin-containing carbon nanofibers as anode material for lithium-ion batteries" Journal of Materials Science (2015) 50(3): p. 1094-1102.

Kamal et al. "Synthesis and catalytic properties of silver nanoparticles supported on porous cellulose acetate sheets and wet-spun fibers." Carbohydrate Polymers (2017) 157, 294-302.

Koczkur et al. "Polyvinylpyrrolidone (PVP) in nanoparticle synthesis" Dalton Transactions (2015) 44:41, 17883-17905.

Lee et al. "Influence of a mixing solvent with tetrahydrofuran and N, N-dimethylformamide on electrospun poly (vinylchloride) nonwoven mats" Journal of Polymer Science Part B: Polymer Physics (2002), 40(19), 2259-2268.

Li et al. "Carbon encapsulated ultrasmall SnO2 nanoparticles anchoring on graphene/TiO2 nanoscrolls for lithium storage" Electrochimica Acta (2014) 147(0): p. 40-46.

"Liu et al. ""Preparation of Nanocrystalline Titanium Dioxide Fibers Using Sol-gel Method and Centrifugal Spinning"" J Sol-Gel Sci Technol (2013) 65:443-451."

Mellado et al. "A simple model for nanofiber formation by rotary jet-spinning" Applied Physics Letters (2011) 99, 203107.

"Nonwovens Interactive", Jun. 8, 2009.

Patel et al. "Novel Preparation Method of Silicon Carbide Nanofibers by Use of Polymer Blend and Melt Spinning Techniques" Journal of Ceramic Society of Japan (2004) 112:S901-S903.

Quintero et al. "Rapid Production of Ultralong Amorphous Ceramic Nanofibers by Laser Spinning" App. Physics Let (2007) 90:153109.

Rein et al. "Electrospinning of ultrahigh-molecularweight polyethylene nanofibers", Journal of Polymer Science: Part B: Polymer Physics (2007) 45(7), 766-773.

Rodriguez et al. "Preparation of Electrospun Chitosa-PEO Fibers" Bioengineering Conference, 2006, Proceedings of the IEEE 32nd Annual Northeast, 87-88, Apr. 2006.

Scheffler et al. "Electrospun teflon AF fibers for superhydrophobic membranes" Journal of Materials Research (2010) 25(8), 1595-1600.

Shen et al. "Tin nanoparticle-loaded porous carbon nanofiber composite anodes for high current lithium-ion batteries" Journal of Power Sources (2015) 278: p. 660-667.

Tran et al. "Electrospun SnO2 and TO2 Composite Nanofibers for Lithium Ion Batteries" Electrochimica Acta (2014) 117(0): p. 68-75.

Tsuji et al. "Rapid transformation from spherical nanoparticles, nanorods, cubes, or bipyramids to triangular prisms of silver with PVP, citrate, and H2O2" Langmuir (2012) 28:24, 8845-8861.

Warner et al. "Cost Effective Nanofiber Formation: Melt Electrospinning" National Textile Center Annual Report, Nov. 2005.

Weitz et al. "Polymer Nanofibers Via Nozzle-Free Centrifugal Spinning" Nano Letters (2008), 8:1187-1191.

Xia et al. "The effects of electrospinning parameters on coaxial Sn/C nanofibers: Morphology and lithium storage performance" Electrochimica Acta (2014) 121(0): p. 345-351.

Zheng et al. "Controlled Crystallization of Sodium Chloride Nanocrystals in Microdroplets Produced by Electrospray from an Ultra-Dilute Solution" European Journal of Inorganic Chemistry (2016), No. 12, 1860-1865.

Zhou et al. "Three-jet electrospinning using a flat spinneret" J. Mater Sci. (2009), 44, 5501-5508.

Zhong et al. "Nanostructued core-shell Sn nanowires @ CNTs with controllable thickness of CNT shells for lithium on battery" Applied Surface Science (2015) 332: p. 192-197.

"Manufacturing: Synthetic and Cellulosic Fiber Formation Technology" www.fibersource.com/f-tutor/techpag.htm Apr. 7, 2011.

Wang et al. "Controllable fabrication and properties of polypropylene nanofibers" Polymer Engineering and Science (2007) 47(11), 1865-1872.

Fang et al. "Needleless Melt-Electrospinning of Polypropylene Nanofibers" Journal of Nanomaterials, (2012) 1-9.

Watanabe "Effect of organic solvent on morphology and mechanical properties of electrospun syndiotactic polypropylene nanofibers" Polymer Bulletin (2011) 67(9), 2025-2033.

Watanabe et al. "Development of Polypropylene Nanofiber Production System" Polymer Reviews (2011) 51(3), 288-308.

Raghaven et al. "Fabrication of Melt Spun Polypropylene Nanofibers by ForcespinningTM" (2013) Journal of Engineered Fibers and Fabrics vol. 8, Issue 1, Mar. 2013.

Ondarcuhu et al. "Drawing a single nanofibre over hundreds of microns", Europhysics Letters (1998), 42(2), 215-220.

Feng et al. "Super-hydrophobic surface of aligned polyacrylonitrile nanofibers" Angewandte Chemie (International ed. in English) (2002), 41(7), 1221-3.

Martin "Membrane—Based Synthesis of Nanomaterials", Chemistry of Materials (1996) 8(8), 1739-1746.

(56) References Cited

OTHER PUBLICATIONS

Ma et al. "Synthetic nano-scale fibrous extracellular matrix", Journal of Biomedical Materials Research (1999) 46(1), 60-72.
Liu et al."Polystyrene-block-poly (2-cinnamoylethyl methacrylate) nanofibers—preparation, characterization, and liquid crystalline properties" Chemistry—A European Journal (1999), 5(9), 2740-2749.
Whitesides et al."Self-assembly at all scales", Science (New York, N.Y.) (2002), 295(5564), 2418-21.
Deitzel et al. "Controlled deposition of electrospun poly (ethylene oxide) fibers", Polymer, (2001) 42(19), 8163-8170.
Doshi et al. "Electrospinning process and applications of electrospun fibers" Journal of Electrostatics (1995), 35(2&3), 51-60.
Subbiah et al. "Electrospinning of nanofibers" Journal of Applied Polymer Science (2005) 96(2), 557-569.
Ellison et al. "Melt blown nanofibers: Fiber diameter distributions and onset of fiber breakup" Polymer (2007) 48(11), 3306-3316.
Theron et al. "Multiple jets in electrospinning: experiment and modeling", Polymer (2005), 46(9), 2889-2899.
Tomaszewski et al. "Investigation of electrospinning with the use of a multi-jet electrospinning head" Fibres & Textiles in Eastern Europe (2005) 13(4), 22-26.
Han et al. "Superhydrophobic and oleophobic fibers by coaxial electrospinning" Langmuir (2009), 25(16), 9454-9462.
Xiong et al."Fabrication of ultrafine fibrous polytetrafluoroethylene porous membrane by electrospinning" Journal of Materials Research (2009), 24(9), 2755-2761.
Wang et al. "Solution-electrospun isotactic polypropylene fibers: processing and microstructure development during stepwise annealing" Macromolecules (2010), 43(21), 9022-9029.
Tan et al."Meltblown fibers: Influence of viscosity and elasticity on diameter distribution" J. Non-Newtonian Fluids Mechanics (2010), 165(15-16), 892-900.
Rangkupan et al. "Electrospinning process of molten polypropylene in vacuum" Journal of Metals, Materials and Minerals (2003) 12(2), 81-87.
Lyons et al."Meltelectrospinning part I: processing parameters and geometric properties" Polymer (2004) 45, 7597-7603.
Zhmayev et al. "Nanofibers from gas-assisted polymer melt electrospinning", Polymer (2010), 51(18), 4140-4144.
Garbarczyk et al. "Polymorphism of isotactic polypropylene in presence of additives, in blends and in composites" Journal of Macromolecular Science, Part B—Physics (2002), 41 (4-6), 1267-1278.
Meille et al. "Structure of β-isotactic polypropylene: a long-standing structural puzzle" Macromolecules (1994) 27(9), 2615-2622.
Dorset et al."Isotactic polypropylene, β-phase: a study in frustration" Polymer (1998), 39(25), 6331-6337.
Reneker et al. "Nanofiber garlands of polycarpolactone by electrospinning" Polymer (2002) 43(25), 6785-6794.
International Search Report and Written Opinion for PCT Application No. PCT/US2020/018725 dated May 11, 2020.

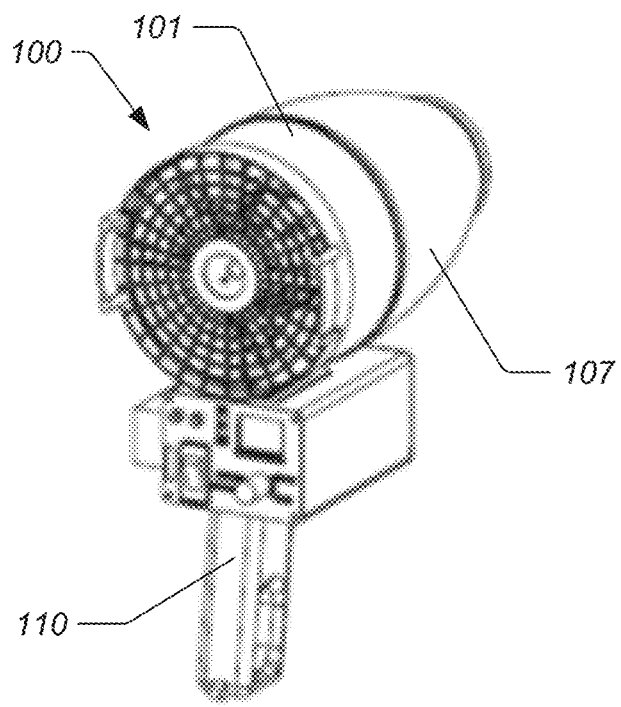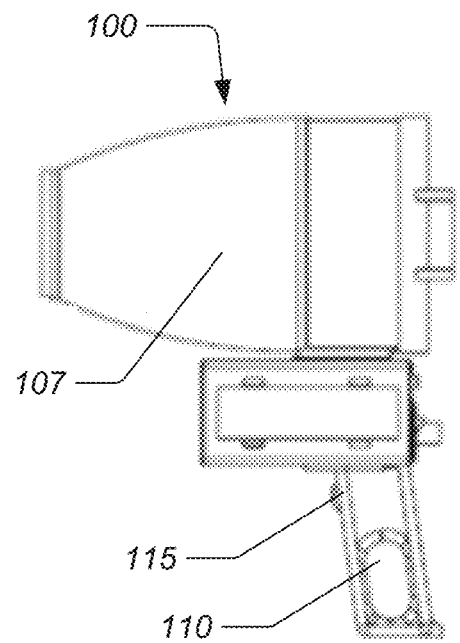
FIG. 1A
FIG. 1B
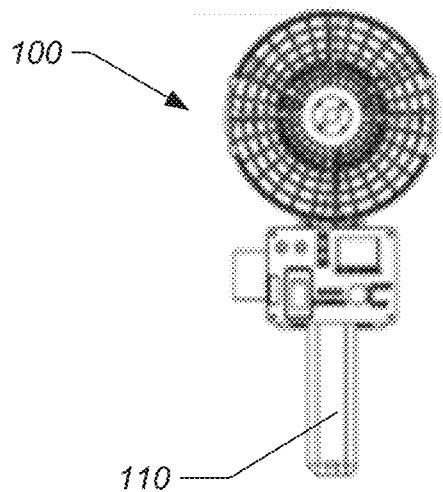
FIG. 1C

HANDHELD/PORTABLE APPARATUS FOR THE PRODUCTION OF MICROFIBERS, SUBMICRON FIBERS AND NANOFIBERS

BACKGROUND OF THE INVENTION

1. Field of the Invention

The present invention generally relates to the field of fiber production. More specifically, the invention relates to production of fibers of micron, sub-micron and nano size diameters using centrifugal forces within a portable device.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells and as agents in wound care such as inducing hemostasis, protecting against infection, accelerating the healing process while offering conformability (e.g., ability to adapt to 3D intricate sections). In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing that the electrospinning process can produce micro and nano fibers of various materials. The process of elecrospinning uses an electrical charge to produce fibers from a liquid. The liquid may be a solution of a material in a suitable solvent, or a melt of the material. Electrospinning requires the use of high voltage to draw out the fibers and is limited to materials that can obtain an electrical charge.

Centrifugal spinning is a method by which fibers are produced without the use of an electric field. In centrifugal spinning, material is ejected through one or more orifices of a rapidly spinning spinneret to produce fibers. The size and or shape of the orifice that the material is ejected from controls the size of the fibers produced. Using centrifugal spinning, microfibers and/or nanofibers may be produced.

Typically, spinnerets used in centrifugal spinning are rotated at high speeds, forcing the polymer solution or melt to travel radially (along a direction pointing along the radius from the center of an object) to promote an unentangled molecular state therefore facilitating fine fibers formation. The high rotational speed used to form the fibers creates high energy requirements, due to rotational air resistance at high speeds. The chambers where the fiber formation occurs need to be large open spaces to promote effective air currents that would produce effective extensional elongation on the polymer solution/melt jet to thin the fibers while also drying (evaporating the solution) or cooling the melt. Even addition of fins to the spinneret or shaft had been proposed to further create the needed aerodynamic environment. Other designs focus on using high air pressure to eject the polymer solution/melt and therefore reduce the chamber size though absolutely needing the pressurized air chamber.

It is desirable to create spinnerets that can effectively produce pressure differential to reduce the chamber size while effectively producing and guiding the fine fibers out of the chamber for successful deposition on the desired collector, avoiding entanglement and enhancing uniform fiber deposition.

SUMMARY OF THE INVENTION

In an embodiment, a handheld/portable device for use in forming microfibers and/or nanofibers comprises: a housing; one or more motors disposed in the housing, a ring-shaped spinneret, disposed in the housing and coupled to one or more of the motors; wherein, during use, rotation of the spinneret causes material placed in the body of the spinneret to travel circumferentially and upwards and ejected through one or more of the openings to produce fibers, and one or more fans incorporated into the spinneret, wherein the one or more fans are configured to produce a pressure differential in the flow of air through the housing such that the fibers are drawn to the center of the flow of air and away from a wall of the housing. In an embodiment, the housing comprises a handle. In an embodiment, the housing comprises a tapered outlet, and wherein fibers produced by the spinneret are blown away from the spinneret into the tapered outlet. A battery may be coupled to the motor.

In an embodiment, the motor and the spinneret are aligned along an axial axis of the housing. In an embodiment, the spinneret comprises a toroidal shape with an air foil cross-section to allow air to flow through the center of the spinneret. The motor may be capable of rotating the spinneret at speeds of greater than about 500 rpm. In an embodiment, the spinneret is removably coupled to at least one motor through a coupling member.

In an embodiment, a first fan and a second fan are coupled to the one or more motors, wherein the second fan is positioned downstream from the first fan, and wherein the second fan is connected to the spinneret such that the spinneret is downstream from the second fan. The housing may further comprise a channeling chamber coupled to the housing, wherein the channeling chamber directs the fibers exiting the fiber producing device during use.

In an embodiment, a method of producing microfibers and/or nanofibers, comprises: placing material in a spinneret of a device as described herein and rotating the spinneret at a speed of at least about 500 rpm, wherein rotation of the spinneret causes material in the body to be ejected through one or more openings to produce fibers; and wherein the fibers produced by the spinneret are blow away from the spinneret by pressure difference created by the spinneret. In an embodiment, the fibers exit the spinneret at an angle of at least 10 degrees. In an embodiment, the microfibers and/or nanofibers are created without subjecting the fibers, during their creation, to an externally applied electric field.

In an embodiment, the method further comprises heating the material to a temperature sufficient to at least partially melt the material; and placing the heated material in the body of the spinneret. In an alternate embodiment, the method further comprises mixing the material with a solvent to produce a mixture of the material in a solvent and placing the mixture in the body of the spinneret.

BRIEF DESCRIPTION OF THE DRAWINGS

Advantages of the present invention will become apparent to those skilled in the art with the benefit of the following detailed description of embodiments and upon reference to the accompanying drawings in which:

FIG. 1A depicts a projection view of a portable fiber producing device;

FIG. 1B depicts a side-view of a portable fiber producing device;

FIG. 1C depicts a front view of a portable fiber producing device;

Figure 2:
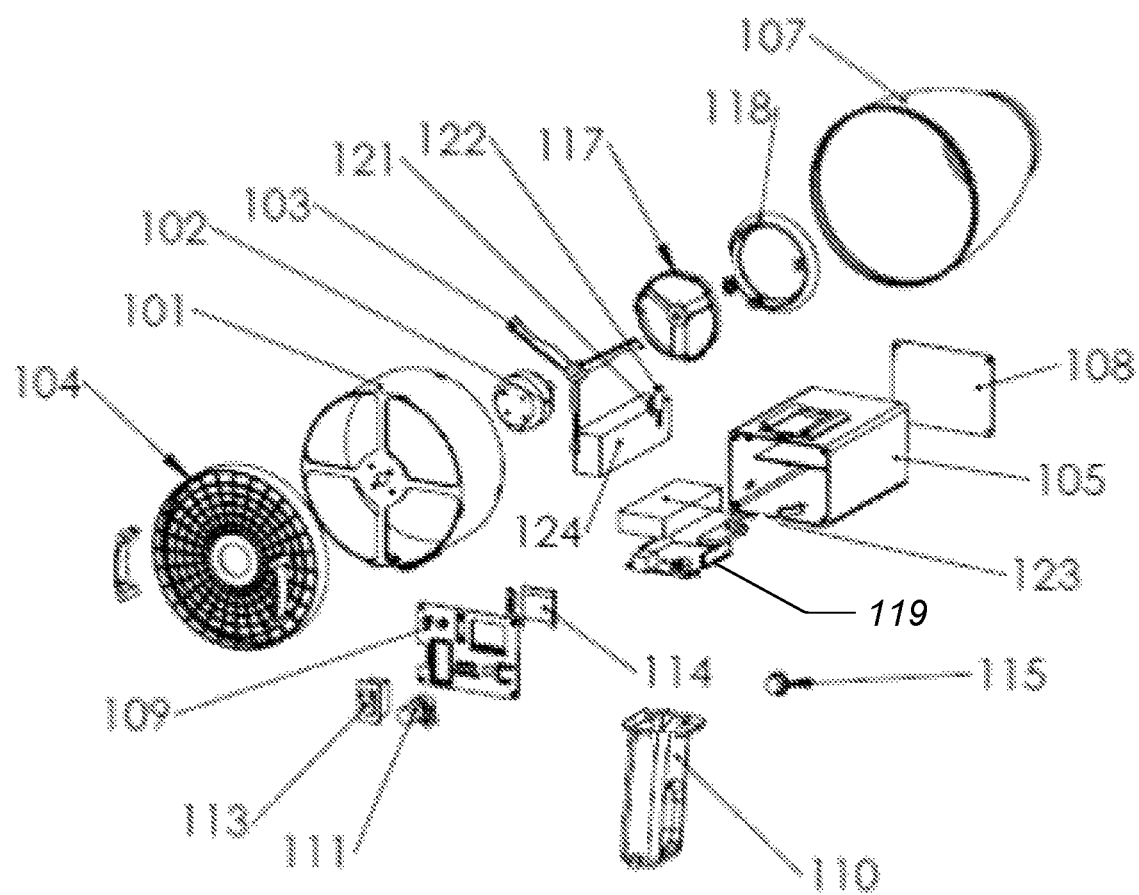
FIG. 2 depicts an exploded view of a portable fiber producing device.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements but is not limited to possessing only those one or more steps or elements. Likewise, an element of an apparatus that "comprises," "has," "includes" or "contains" one or more features possesses those one or more features but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Patents and Published Patent Applications: US 2009/0280325; US 2009/0269429; US 2009/0280207; US 2013/0300012; US 2014/0159263; US 2015/0061180; US 2017/0081786; U.S. Pat. Nos. 8,231,378; 8,828,294; 9,988,271; and 10,087,554; all of which are incorporated herein by reference.

FIG. 1 depicts an embodiment of a portable fiber producing device 100. FIG. 1A is a projection view of the device. FIG. 1B is a side view of the device. FIG. 1C is a front view of the device. Portable fiber producing device 100 includes a motor housing 101 and an outlet housing 107. The portable fiber producing device may have a size and shape that allows the fiber producing system to be portable. For example, the portable fiber producing device may have a shape similar to a hair dryer. In some embodiments, the device has a weight of less than 10 kgs, less than 5 kg, or less than 2 kg. In an embodiment, portable fiber producing device 100 includes a handle 110. Handle 110 may be positioned to allow a user to hold the fiber producing system in a manner such that the fiber producing system can be aimed in a direction that the fibers are needed. Thus, a user may be able to selectively direct fibers to a surface of interest. Handle 110 may include a switch 115 (e.g., a trigger switch) which can be used to operate the fiber producing system.

An exploded view of an embodiment of portable fiber producing device 100 is depicted in FIG. 2. Fiber producing device 100 includes one or more motors 102. Motor 102 is coupled to a primary fan 103 and a smaller secondary fan 117 (for example, a 2.5" fan) with a higher pitch than the primary fan. A spinneret 118 is coupled to motor 102, downstream from fans 103 and 117. Spinneret 118 includes a body having one or more openings and chambers 129. (See FIG. 3). Motor 102, fans (103 and 117), and spinneret 118 may all be disposed in housing 101. A removable (and, in some embodiments, disposable) outlet housing 107 may be coupled to housing 101. In some embodiment, outlet housing 107 is coupled to motor housing 101 with a twist and lock system. The exit opening of the outlet housing diameter is smaller than the spinneret outer diameter. A filter or screen 104 may be placed at the inlet end of housing 101 to filter dust and debris from the gas (e.g., air) being pulled into the system by fans 117 and 103.

In an embodiment, operation of push button switch (NO, Normally Open) 115 causes the fan and spinneret to begin spinning, producing an outward flow of fibers from outlet housing 107. In order to improve portability of the device, fiber producing system 100 may have an internal power source 124 (e.g., a battery). Internal power source 124 may be coupled to motors 102 and switch via wiring disposed inside electronic components housing 105. Internal power source 124 may also include an adapter which allows the fiber producing device to be plugged into an external outlet. If the internal power source is a rechargeable battery, plugging the fiber producing device into an external outlet provides power to operate the fiber producing device and recharge the battery. The portable fiber producing device may also include a main power button 113. Power for all components of the fiber producing may be activated when the main power button 113 is in the "on" position. Push button switch 115, may be disposed on the forward-facing portion of handle 110. Push button switch 115 may be used to activate motors, fans and spinneret to start the formation of fibers. The status of the portable fiber producing device may be displayed on display screen 114 (e.g., an LED screen).

Motors 102 are controlled with an electronic speed controller (ESC) 123 and a microcontroller 119, which are disposed in electronic components housing 105. Front cover 108 and back cover 109 together seal the electronic components inside of electronic component housing 105. A potentiometer knob 111 is coupled to ESC 123 and is used to adjust the motor speed. An IR sensor 122 may be optically coupled to fans (103 and 117) to monitor the speed and operation of the fans. A laser pointer 121 may be positioned in the housing 101 to provide a light to help aim the portable fiber producing device.

Figure 3A:
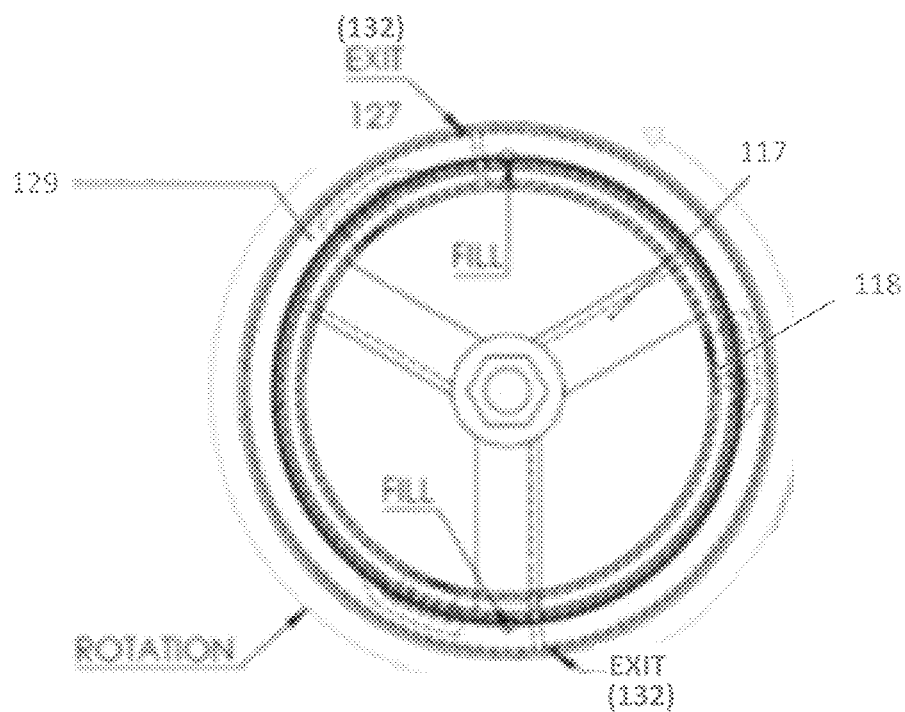
FIG. 3A depicts a front-view of a spinneret coupled to a fan.
Figure 3B:
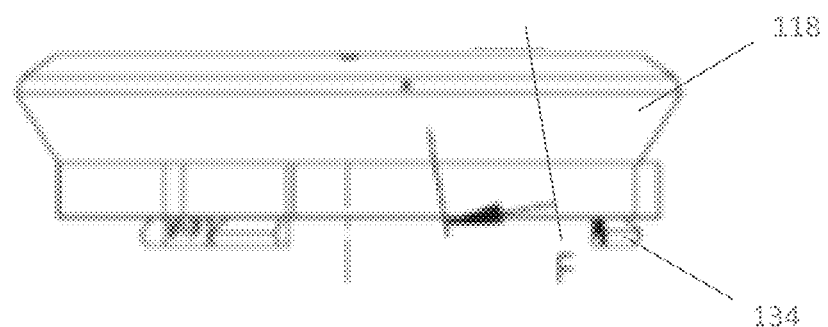
FIG. 3B depicts a side-view of a spinneret.
Figure 3C:
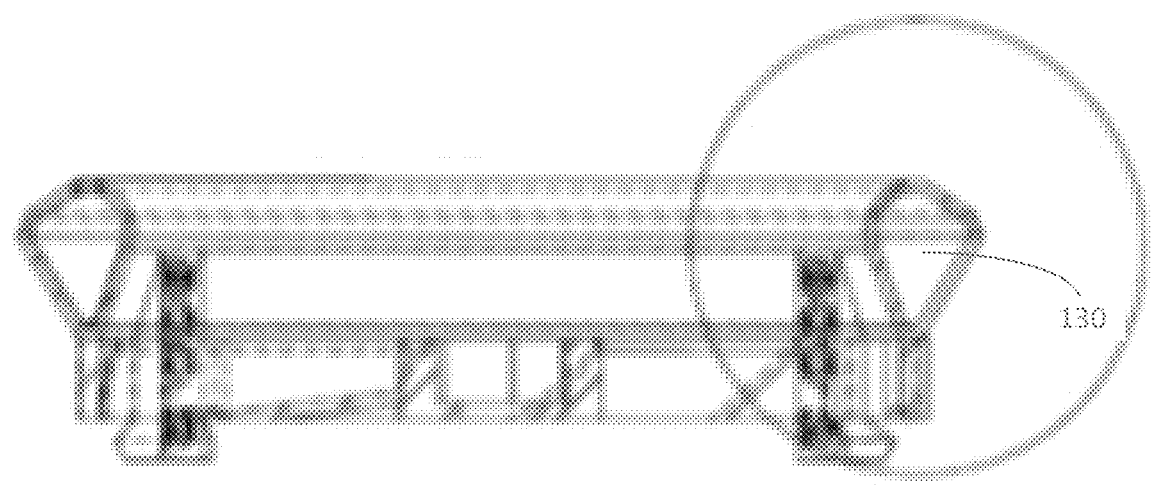
FIG. 3C depicts a cross-sectional view of a spinneret.
Figure 3D:
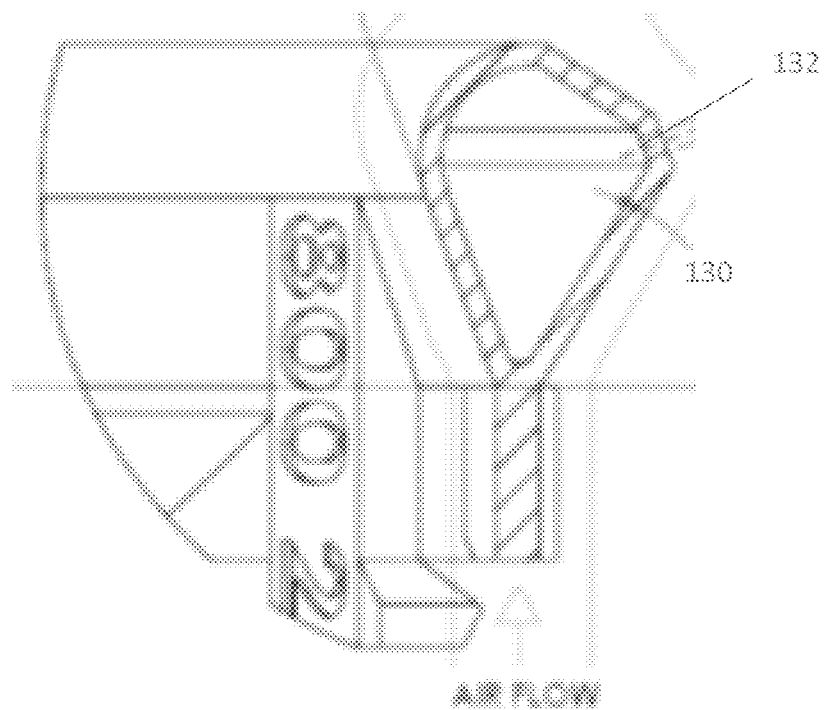
FIG. 3D depicts a zoomed in cross-sectional view of a spinneret.

FIGS. 3A-3D depict various views of a spinneret used in the portable fiber producing device that provides the alternative to use small chambers. FIG. 3A depicts a spinneret 118 coupled to secondary fan 117. FIG. 3B is a side view of spinneret 118. A cross-section view of spinneret 118 along line F (FIG. 3B) is depicted in FIG. 3C. FIG. 3D depicts a zoomed in view of the circled region of FIG. 3C. The spinneret, in this embodiment, has a toroidal shaped chamber 130 having a fluid exit 132 that extends along a portion of the toroidal chamber. In an embodiment, the spinneret 118 may include an inlet (fill) (See FIG. 3A) that receives material to be spun into fibers. This design forces the polymer solution/melt to travel circumferentially while effectively providing the required airflow to channel to expel the material. A pressure differential is created by the spinneret design and the fibers are propelled through a controlled path for deposition.

Figure 4A:
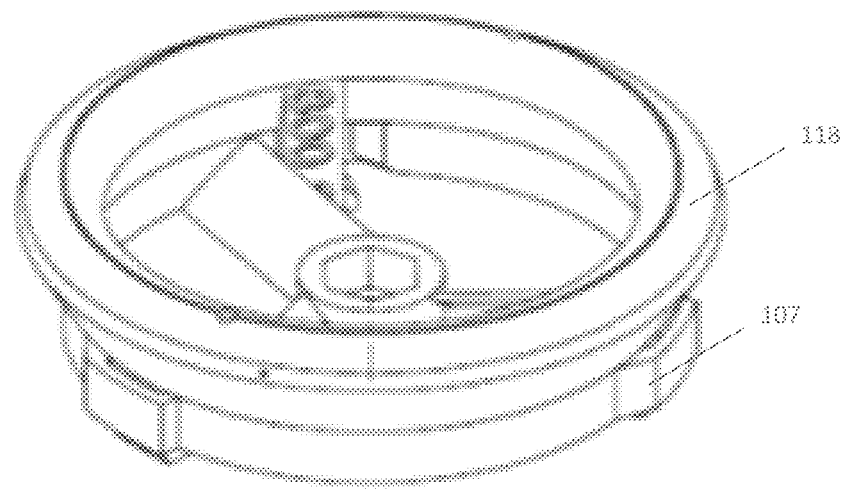
FIG. 4A depicts a projection view of a spinneret coupled to a fan.
Figure 4B:
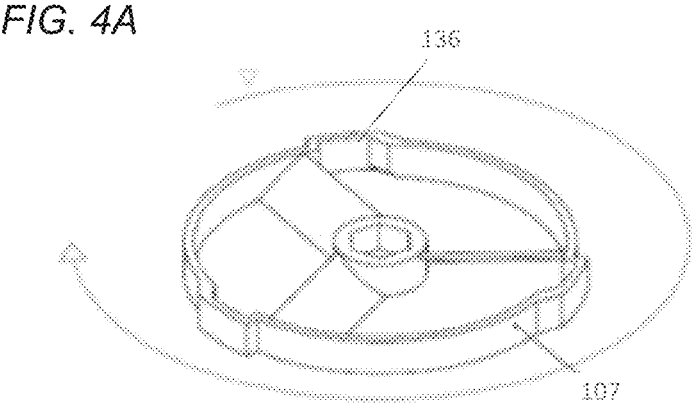
FIG. 4B depicts a projection view of a fan having receiving tabs.
Figure 4C:
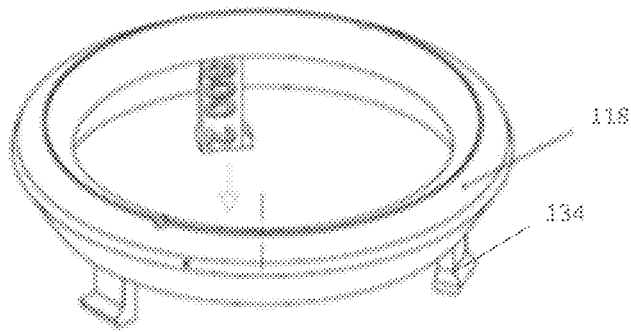
FIG. 4C depicts a projection view of a spinneret having connection tabs.

The spinneret 118 may be a disposable cartridge that is removable and couplable to the secondary fan 117. FIG. 4A depicts a projection view of a spinneret 118 coupled to secondary fan 117. Spinneret 118 includes connection tabs 134 as shown in FIG. 4C. Fan 117 includes receiving tabs 136 as shown in FIG. 4B. The connection tabs 134 of spinneret 118 couple with receiving tabs 136 to removably lock the spinneret to fan 117. Spinneret 118 attaches to fan 117 with a twist and lock system (tabs 134 and 136) that allows for quick changing of the spinneret (See FIG. 4).

Figure 5:
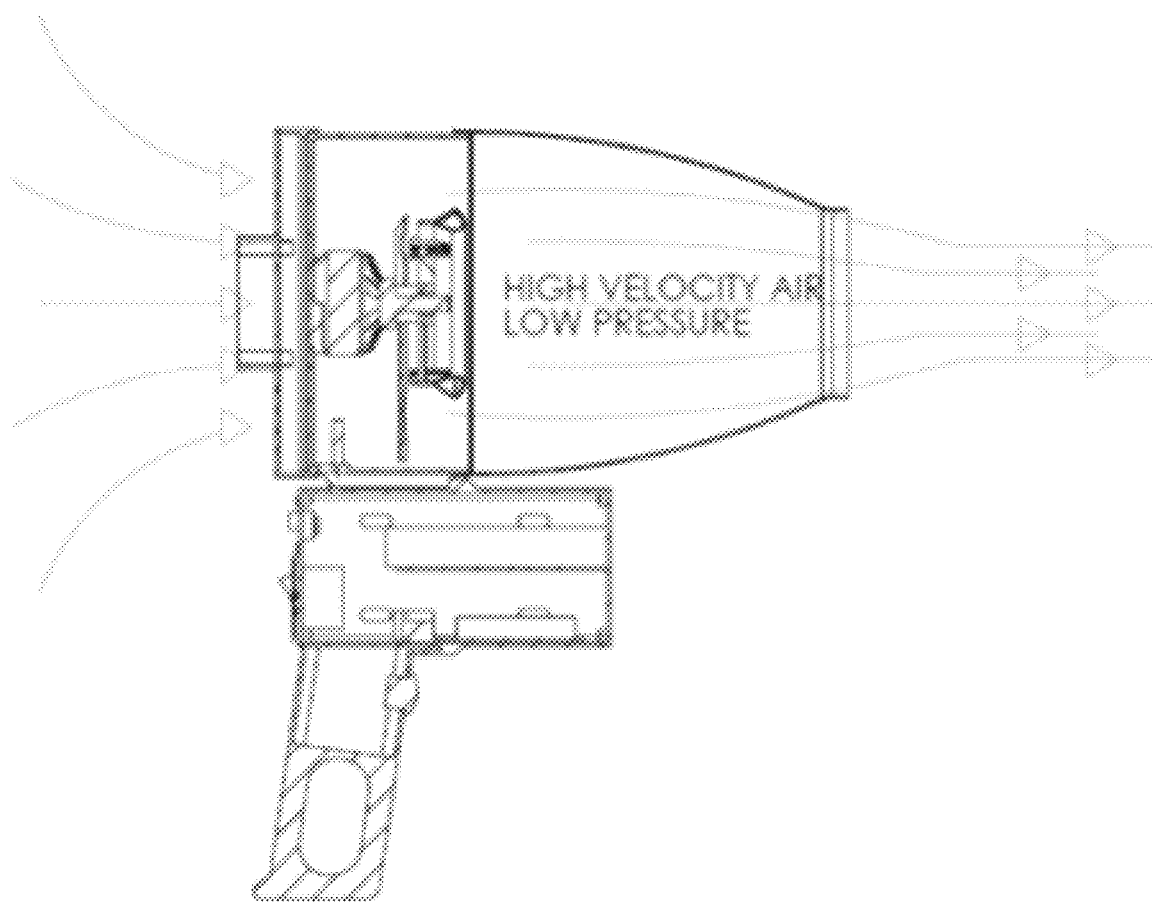
FIG. 5 depicts a cut-away view of a fiber producing device in operation.

Referring to FIG. 3D, the spinneret has geometry (air foil) which promotes faster fluid (e.g., air) flow at the center. Also, the tapered geometry at the center of the toroid forms a nozzle (See FIG. 3D). These characteristics draw the fibers into the center and away from the wall of the housing (nozzle) as shown in FIG. 5. The fiber outlet is angled upwards (e.g., up to 20 degrees above horizontal) to assist the fibers' change in directions from radial to longitudinal in relation to the rotation of the motor. (See FIG. 3D). The secondary fan 117 also provides increased air velocity at the center of flow and is coupled to the motor 102. During use, rotation of the spinneret causes material placed in the body (each chamber) of the spinneret to be ejected through one or more of the openings 132 to form fibers.

In some embodiments, push button switch 115 (NO, Normally Open) may have safety devices which, upon release, stop the spinneret. A variable speed switch (potentiometer knob 111) may allow continuous adjustment of the speed or discrete adjustment of the speed (e.g., preselected values such as low (20% of max speed), medium (50% of max speed), and high (100% of max speed). A complete range of available RPM is also achievable using an Arduino micro-controller, a 10K potentiometer, and an ESC (Electronic Speed Controller) to control a brushless DC motor (BLDC). The speed setting will not be affected by pressing the push button switch. Each time the push button is pressed, the speed will return to the set RPM. Fine tuning of the RPM may also be necessary as the battery voltage drops due to operation.

To improve the air flow through the device, the inner surface of housing may include one or more guiding channels that direct air flow through the housing. The housing may include a plurality of vents formed in the housing that direct air flow from the fan through the housing. In this manner, gas flow from the fan is directed to the fibers as the fibers are being produced. The vents within the housing direct the air flow produced by the fan perpendicularly to the rotating spinneret and remove the vorticity of the air flow caused by the rotating fan.

In an embodiment, outlet housing 107 may have a parabolic or conical tapered outlet. During use, fibers produced by spinneret 118 may be blow away from the spinneret into the tapered outlet housing 107. In an embodiment, tapered outlet housing 107 may be in the form of a channeling chamber (e.g., a funnel) coupled to the housing 101 with a twist and lock system. A twist and lock system allows the channeling chamber (perhaps disposable nozzle) to be removed from the housing, allowing replacement of a disposable spinneret, and general cleaning of the interior of the fiber producing device. In some embodiments, channeling chamber may also be removable allowing alternate channeling chambers to be attached to the housing.

In an embodiment, a heating element may be incorporated in the housing and/or spinneret to allow heating of the spinneret. Use of a heating element may be particularly useful for melt spinning of fibers.

The fiber production device described above uses rotating and aerodynamic forces to produce and control fiber formation and deposition. In some embodiments, the housing includes all necessary components to produce fibers, and has a size and shape that allows the device to be hand-held/portable. The fiber producing device relies on centrifugal spinning to create fibers as the material is ejected from the spinneret. Thus, no external electric field is required, or used, to create fibers.

Fibers represent a class of materials that are continuous filaments or that are in discrete elongated pieces, similar to lengths of thread. Fibers are of great importance in the biology of both plants and animals, e.g., for holding tissues together. Human uses for fibers are diverse. For example, fibers may be spun into filaments, thread, string, or rope. Fibers may also be used as a component of composite materials. Fibers may also be matted into sheets to make products such as paper or felt. Fibers are often used in the manufacture of other materials.

Fibers as discussed herein may be created using, for example, a solution spinning method or a melt spinning method. In both the melt and solution spinning methods, a material may be put into a spinneret which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester, polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In either the solution or melt spinning method, as the material is ejected from the spinning spinneret, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The methods discussed herein may be used to create, for example, nanocomposites and functionally graded materials that can be used for fields as diverse as, for example, drug delivery, wound healing, and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or micro-electric mechanical systems (MEMS).

Some embodiments of a spinneret may be used for melt and/or solution processes. Some embodiments of a spinneret may be used for making organic and/or inorganic fibers. With appropriate manipulation of the environment and process, it is possible to form fibers of various configurations, such as continuous, discontinuous, mat, random fibers, unidirectional fibers, woven and nonwoven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a spinneret helps control various properties of the fibers, such as the cross-sectional shape and diameter size of the fibers. More particularly, the speed and temperature of a spinneret, as well as the cross-sectional shape, diameter size and angle of the outlets in a spinneret, all may help control the cross-sectional shape and diameter size of the fibers. Lengths of fibers produced may also be influenced by the choice of spinneret used. In this design the open spinneret is also the main feature that influence portability by allowing the air to flow at a greater velocity through the center of the spinneret 125. This causes a pressure drop (due to Bernoulli's Principle) that will draw the fibers into the center of flow and away from the housing wall. This is achieved with the air foil shape of the toroidal cross-section 130, but also with the addition of the secondary fan 117 integrated into the hub that attaches the fan to the motor shaft 102.

The temperature of the spinneret may influence fiber properties, in certain embodiments. Both resistance and inductance heaters may be used as heat sources to heat the spinneret. In certain embodiments, the spinneret is thermally coupled to a heat source that may be used to adjust the temperature of the spinneret before spinning, during spinning, or both before spinning and during spinning. In some embodiments, the spinneret is cooled. For example, a spinneret may be thermally coupled to a cooling source that can be used to adjust the temperature of the spinneret before spinning, during spinning, or before and during spinning. Temperatures of a spinneret may range widely. For example, a spinneret may be cooled to as low as −20 C or heated to as high as 2500 C. Temperatures below and above these exemplary values are also possible. In certain embodiments, the temperature of a spinneret before and/or during spinning is between about 4° C. and about 400° C. The temperature of a spinneret may be measured by using, for example, an infrared thermometer or a thermocouple.

The speed at which a spinneret is spun may also influence fiber properties. The speed of the spinneret may be fixed while the spinneret is spinning, or may be adjusted while the spinneret is spinning. In the methods described herein, the spinneret may be spun at a speed of about 500 RPM to about 15,000 RPM, or any range derivable therein. In certain embodiments, the spinneret is rotated at a rate of about 5,000 RPM to about 15,000 RPM.

In an embodiment, a method of creating fibers, such as microfibers and/or nanofibers, includes: heating a material; placing the material in a heated spinneret; and, after placing the heated material in the heated spinneret, rotating the spinneret to eject material to create nanofibers from the material. In some embodiments, the fibers may be microfibers and/or nanofibers. A heated spinneret is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the spinneret is not heated. Indeed, for any embodiment that employs a spinneret that may be heated, the spinneret may be used without heating. In some embodiments, the spinneret is heated but the material is not heated. The material becomes heated once placed in contact with the heated spinneret. In some embodiments, the material is heated and the spinneret is not heated. The spinneret becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a spinneret, and the spinneret is rotated for at least about 10 seconds. As discussed above, the rotation may be at a rate of about 500 RPM to about 15,000 RPM, for example. The amount of material may range from mL to liters (L), or any range derivable therein. For example, in certain embodiments, at least about 50 mL to about 100 mL of the material are positioned in the spinneret, and the spinneret is rotated at a rate of about 500 RPM to about 25,000 RPM for about 300 seconds to about 2,000 seconds. In certain embodiments, at least about 5 mL to about 100 mL of the material are positioned in the spinneret, and the spinneret is rotated at a rate of 500 RPM to about 25,000 RPM for 10-500 seconds. In certain embodiments, at least 100 mL to about 1,000 mL of material is positioned in the spinneret, and the spinneret is rotated at a rate of 500 RPM to about 25,000 RPM for about 100 seconds to about 5,000 seconds. Other combinations of amounts of material, RPMs and seconds are contemplated as well.

Typical dimensions for spinneret are in the range of about 0.1 inches to several inches in diameter and in height. In some embodiments, a spinneret has a diameter of between about 0.25 inch to about 1 inch.

In certain embodiments spinneret includes at least one opening and the material is extruded through the opening to create the nanofibers. In certain embodiments, the spinneret includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

In an embodiment, material may be positioned in a body of a spinneret. In certain embodiments, the body includes one or more openings in communication with the concave cavity. The fibers are extruded through the one or more openings while the spinneret is rotated about a spin axis. The one or more openings have an opening axis that is not parallel with the spin axis. The spinneret may include a body that includes the concave cavity and a lid positioned above the body.

Another spinneret variable includes the material(s) used to make the spinneret. Spinnerets may be made of a variety of materials, including metals (e.g., brass, aluminum, stainless steel) and/or polymers. The choice of material depends on, for example, the temperature the material is to be heated to, or whether sterile conditions are desired.

The material employed may include one or more components. The material may be of a single phase (e.g., solid or liquid) or a mixture of phases (e.g., solid particles in a liquid). In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers (wound care applications), water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, beta-lactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly(methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP).

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., a bismuth alloy), a metal/ceramic composite or ceramic oxides (e.g., Vanadium pentoxide, titanium dioxide).

The fibers that are created may be, for example, one micron or longer in length. For example, created fibers may be of lengths that range from about 1 $\mu$m to about 50 cm, from about 100 $\mu$m to about 10 cm, or from about 1 mm to about 3 m. In some embodiments, the fibers may have a narrow length distribution. For example, the length of the fibers may be between about 1 $\mu$m to about 9 $\mu$m, between about 1 mm to about 9 mm, or between about 1 cm to about 3 cm. In some embodiments, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a spinneret (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In one embodiment, microfibers and nanofibers may be produced substantially simultaneously. Any spinneret described herein may be modified such that one or more openings has a diameter and/or shape that produces nanofibers during use, and one or more openings have a diameter and/or shape that produces microfibers during use. Thus, a spinneret, when rotated will eject material to produce microfibers or nanofibers. In some embodiments, nozzles may be designed to create microfibers or nanofibers.

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, nonwoven materials, filtration (e.g., air, water, fuel, semiconductor, biomedical, etc); automotive; sports; aeronautics; space; energy transmission; papers; substrates; hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NF for filters; wound dressing, cell growth substrates or scaffolds; battery separators; charged polymers or other materials for solar energy; NF for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti-microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

The principal causes of death among soldiers who die within the first hour after injury are hemorrhage and traumatic brain injury. There is a need to develop technologies that could promote early intervention in life-threatening injuries. These new devices/materials must be easily transportable (i.e., compact, lightweight); easy to use, low maintenance, adaptable to different environments and should have self-contained power sources as necessary.

In an embodiment, a hand-held fiber producing device, as described herein, may be used to provide fibers to an injury site, to stop hemorrhaging and promote tissue mending. In an embodiment, an appropriate fiber producing material is loaded into a hand-held fiber producing device, as described above. When an injury occurs, the hand-held fiber producing device may be used to apply fibers (e.g., microfibers and/or nanofibers) to the wound site. The fibers applied to the wound site accelerate the stoppage of blood loss and promote tissue healing.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A handheld/portable device for use in forming microfibers and/or nanofibers comprising:
 a housing;
 one or more motors disposed in the housing,
 a ring-shaped spinneret having a chamber with a toroidal cross-section and one or more openings at an exit end of the chamber, wherein the spinneret is disposed in the housing and coupled to one or more of the motors;
 wherein, during use, rotation of the spinneret causes material placed in the chamber of the spinneret to travel circumferentially and upwards and ejected through the one or more openings to produce fibers, and
 one or more fans incorporated into the spinneret, wherein the one or more fans are configured to produce, in combination with the toroidal cross-section of the chamber, a pressure differential in the flow of air through the chamber such that the fibers are drawn to a center of the flow of air and away from a wall of the chamber.

2. The device of claim 1, wherein the housing comprises a handle.

3. The device of claim 1, wherein the housing comprises a tapered outlet, and wherein fibers produced by the spinneret are blown away from the spinneret into the tapered outlet.

4. The device of claim 1, wherein the motor and the spinneret are aligned along an axial axis of the housing.

5. The device of claim 1, wherein the spinneret comprises a toroidal shape with an air foil cross-section to allow air to flow through the center of the spinneret.

6. The device of claim 1, wherein the motor is capable of rotating the spinneret at speeds of greater than about 500 rpm.

7. The device of claim 1, wherein the spinneret is removably coupled to at least one motor through a coupling member.

8. The device of claim 1, wherein the fibers produced by the spinneret comprise microfibers.

9. The device of claim 1, wherein the fibers produced by the spinneret comprise nanofibers.

10. The device of claim 1, further comprising a battery coupled to motor.

11. The device of claim 1, further comprising a channeling chamber coupled to the housing, wherein the channeling chamber directs the fibers exiting the fiber producing device during use.

12. The device of claim 11, comprising a first fan and a second fan coupled to the one or more motors, wherein the second fan is positioned downstream from the first fan, and wherein the second fan is connected to the spinneret such that the spinneret is downstream from the second fan.

13. The device of claim 1, wherein the one or more fans includes a first fan and a second fan coupled to the one or more motors, wherein the second fan is connected upstream of the chamber.

14. A handheld/portable device for use in forming fibers comprising:
  a housing;
  a motor disposed in the housing;
  at least two fans coupled to the motor; and
  a spinneret coupled to the motor downstream of the at least two fans, wherein the spinneret has a chamber with a toroidal cross-section and at least one opening at an exit of the chamber;
  wherein, during use, rotation of the spinneret causes material placed in the chamber to travel circumferentially and upwards and ejected the at least one opening to produce fibers; and
  wherein the at least two fans are configured to produce a flow of air through the chamber, the toroidal cross-section of the chamber causing air flow at a center of the spinneret to have a greater velocity than air flow along a wall of the spinneret, said velocities causing the fibers to be drawn to the center of the spinneret and away from the wall of the spinneret.

15. The device of claim 14, wherein the motor and the spinneret are aligned along an axial axis of the housing.

16. The device of claim 14, wherein the motor is capable of rotating the spinneret at speeds of greater than about 500 rpm.

17. A handheld/portable device for use in forming fibers, comprising:
  a housing;
  one or more motors disposed in the housing,
  a ring-shaped spinneret having one or more openings at an end of the spinneret, wherein the spinneret is disposed in the housing and coupled to one or more of the motors;
  wherein, during use, rotation of the spinneret causes material placed in the spinneret to travel circumferentially and upwards and ejected through the one or more openings to produce fibers; and
  a first fan and a second fan coupled to the one or more motors, wherein the second fan is positioned downstream from the first fan, and wherein the second fan is connected to the spinneret such that the spinneret is downstream from the second fan, wherein the fans are configured to produce a pressure differential in the flow of air through the housing such that the fibers are drawn to a center of the flow of air and away from a wall of the housing.

18. The device of claim 17, wherein the pressure differential in the flow of air through the chamber such that the fibers are drawn to the center of the spinneret and away from the wall of the spinneret.

19. The device of claim 17, wherein the motor and the spinneret are aligned along an axial axis of the housing.

20. The device of claim 17, wherein the ring-shaped spinneret includes a chamber with a toroidal cross-section, wherein the flow of air is through the chamber, and wherein the pressure differential in the flow of air is caused by the toroidal cross-section of the chamber.

* * * * *